Figure 1:
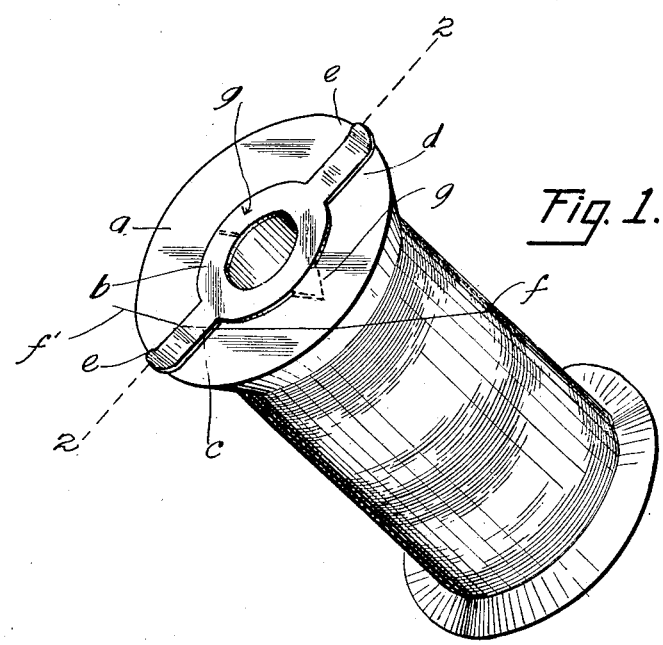

L. M. PFUNDER.
THREAD HOLDING AND CUTTING ATTACHMENT FOR SPOOLS.
APPLICATION FILED NOV. 6, 1919.

1,350,881.
Patented Aug. 24, 1920.

Inventor:
Louise M. Pfunder:

UNITED STATES PATENT OFFICE.

LOUISE M. PFUNDER, OF PORTLAND, OREGON.

THREAD HOLDING AND CUTTING ATTACHMENT FOR SPOOLS.

1,350,881.     Specification of Letters Patent.     Patented Aug. 24, 1920.

Application filed November 6, 1919. Serial No. 336,223.

*To all whom it may concern:*

Be it known that I, LOUISE M. PFUNDER, a citizen of the United States, and resident of Portland, county of Multnomah, State of Oregon, have invented a new and useful Thread Holding and Cutting Attachment for Spools, of which the following is a specification.

Any one using a spool of sewing thread has found a need for fastening the free end to one or the other head of the spool, so as to secure the free end from unwinding. To provide for such fastening, one or the other head of the spool is usually provided with a split cut in it; but many times, after repeated use, a portion of the head is broken away at the slit, thus destroying the fastening means.

Strong thread also offers difficulties in severing, and a knife or scissors is not always handy.

The object of my invention is to provide an inexpensive device for attaching to the head of a spool of thread, whereby to hold the loose end of the thread in place; and the device to be adapted incidentally to serve as an instrument for severing the end.

It is further my object so to make my device that it may be readily attached to the spool head without any work having to be done on the latter.

A further essential feature of my invention is that its attachment does not in any way block the hole of the spool, since that must be left open so that the spool may be mounted on the spool-peg of a sewing machine.

I attain my object in a device which in a general way may be described as: an attachment for a spool of thread consisting of an annular body having means for fastening to the spool head, and provided with opposite, laterally projecting, flat, resilient arms; said arms being adapted to bear down firmly on the spool head, and the extremities of the arms being curved up slightly, so as to facilitate the drawing of the thread-end thereunder.

Figure 2:
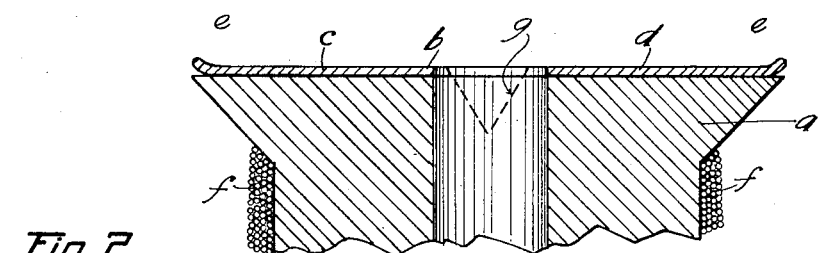

A more particular description of my device is hereinafter given with reference to the accompanying drawings in which:

Figure 1 is a perspective representing a spool of thread, one head of the spool being provided with my device, which is represented as holding the free end of the thread; and Fig. 2 is a longitudinal section of the spool and my attachment, the section being taken approximately on the broken line 2—2 of Fig. 1. Both views being drawn on an exaggerated scale so as to facilitate illustration, and Fig. 2 being more or less diagrammatic.

On one head $a$, of the spool of thread is affixed my device $b$ as shown in Fig. 1. My device is conveniently stamped out of a thin flat piece of resilient metal. It consists of an annular body, or main portion having a central opening corresponding in size with the hole of the spool and, provided with opposite, laterally projecting, resilient arms as $c$, and $d$. These arms are of such length that they extend to the rim of the spool head, and my attachment is adapted to cause these arms to bear firmly down on the spool head on which mounted. The arms serve both as a holding and a cutting medium for the end $f''$ of the thread $f$. The extremities of the arms are turned up so as to facilitate inserting the thread end under them.

The main portion of my attachment is provided with pegs $g$, or similar devices, adapted for driving into the spool head, and in so doing affixing my attachment in place.

It has been found by me in practice to be more practical to make my device with two arms, since it provides a better means for securing the thread-end by inserting it under both arms. It is also possible that in affixing my attachment on a spool head, it would not be so put in place as to lie flat against the spool head, and if it had only a single arm the latter might be so positioned as to be spaced from the top of the spool head, and therefore would not hold the thread-end. But by making my device with two oppositely projecting arms, if my attachment were not properly put in place, one arm at least would bear firmly on the spool head.

I claim:

1. A thread holder and cutter attachment for spools made of a thin flat plate of resilient metal, consisting of an annular main part having a central opening corresponding in size with the hole of the spool, said annular main part being provided with pegs for fastening on the head of the spool, and having integral opposite arms extending to the rim of the spool head and adapted to bear on the latter, thereby assuring that one or the other of said arms will bear on the spool head and hold the thread end notwithstanding said attachment is not affixed in parallel relation to the spool head, the edges of said arms serving as means for cutting the thread.

2. A thread holder and cutter attachment for spools made of a thin flat plate of resilient metal, consisting of an annular main part having a central opening corresponding in size with the hole of the spool, said annular main part being provided with pegs for fastening on the head of the spool, and having integral opposite arms extending to the rim of the spool head and adapted to bear on the latter, thereby assuring that one or the other of said arms will bear on the spool head and hold the thread end notwithstanding said attachment is not affixed in parallel relation to the spool head, the extremities of said arms being turned up to facilitate the insertion of the thread end thereunder, the edges of said arms serving as means for cutting the thread.

LOUISE M. PFUNDER.